United States Patent
Ebel et al.

[11] Patent Number: 5,893,591
[45] Date of Patent: Apr. 13, 1999

[54] TUBE CONNECTING MEANS

[75] Inventors: Rolf Ebel, Siegburg; Norbert Felder, Hennef, both of Germany

[73] Assignee: Walterscheid Rohrverbindungstechnik GmbH, Lohmar, Germany

[21] Appl. No.: 08/772,229

[22] Filed: Dec. 20, 1996

[51] Int. Cl.$^6$ .................................................. F16L 19/028
[52] U.S. Cl. ........................ 285/354; 285/334.5; 285/342
[58] Field of Search ................. 285/354, 334.5, 285/342, 343

[56] References Cited

U.S. PATENT DOCUMENTS

| | | |
|---|---|---|
| 2,131,509 | 9/1938 | Goepel et al. |
| 2,458,817 | 1/1949 | Wolfram . |
| 3,092,404 | 6/1963 | MacWilliam . |
| 3,337,181 | 8/1967 | Wennerstrom . |
| 3,393,930 | 7/1968 | Ziherl et al. . |
| 3,751,002 | 8/1973 | Folkerts et al. . |
| 4,693,502 | 9/1987 | Oetiker ............................ 285/334.5 |
| 4,754,995 | 7/1988 | Takahashi et al. . |
| 4,805,944 | 2/1989 | Reginaldo ............................ 285/354 |
| 5,060,988 | 10/1991 | Williamson ........................... 285/354 |

FOREIGN PATENT DOCUMENTS

| | | |
|---|---|---|
| 0 456 377 A2 | 11/1991 | European Pat. Off. . |
| 1848051 | 3/1962 | Germany . |
| 139289 | 12/1979 | Germany ............................ 285/354 |
| 240 059 A1 | 8/1985 | Germany . |
| 36 20 869 A1 | 12/1987 | Germany . |
| 3-219192 | 9/1991 | Japan ............................ 285/334.5 |
| 2146402 | 4/1985 | United Kingdom . |
| 2291947 | 2/1996 | United Kingdom . |

*Primary Examiner*—Eric K. Nicholson
*Attorney, Agent, or Firm*—Harness, Dickey & Pierce, P.L.C.

[57] ABSTRACT

A tube connector (1) has a connecting member (2), a nut (7), and a tube (11). To connect the connecting member (2) to the tube (11), the tube includes a formation (12) with two formation portions (14, 16). The first formation portion (14) has a first tensioning face (13) which extends parallel to an end face (4) of the connecting member (2). The second formation portion (16) has a second tensioning face (15). The tensioning face (15) extends in such a way which corresponds to the second conical bore (9) of the nut (7). The end face (4) includes an annular groove to receive a seal (23). The seal (23) achieves a precision sealing effect. A connector (1) which includes a formation as described above provides advantageous sealing conditions and ensures that the formation cannot be overtightened, especially during repeat assembly procedures.

5 Claims, 1 Drawing Sheet

TUBE CONNECTING MEANS

BACKGROUND OF THE INVENTION

The invention relates to a tube connecting mechanism which defines a longitudinal axis, and a connecting member. The connecting member includes a first bore starting from a planar end face of the connecting member. A nut is threadable onto the connecting member. The nut has a conical bore tapered away from the connecting member. A tube is guided through a bore of the nut. The tube includes a formation with two tensioning faces. The first tensioning face is supported on the connecting member in the tensioned condition of the tube connecting mechanism. The second tensioning face has a conical shape which corresponds to that of the conical bore of the nut and is supported in the conical bore of the nut.

Tube connectors are described in DD 240 059 A1. Here, the tube includes a connecting portion which is formed of the tube material and has contours of a standardized cutting ring. In consequence, the connecting member is provided with a conical bore having a 24° cone. The nut has a conical bore with a 90° cone in accordance with the standard. The cone angle of the first tensioning face, associated with the conical bore of the connecting member, is smaller than the cone angle of the conical bore of the connecting member. This achieves a linear contact of the first tensioning face at the smallest diameter of the conical bore. This measure is introduced to increase the sealing effect. The second tensioning face, which cooperates with the union nut, is pressed on. The conical piece starting from and running out forwardly towards the tube end is formed onto the second tensioning face by means of the first tensioning face. The disadvantage of such linear support is that due to the high axial threading forces, high surface pressures are generated which lead to settlement as a result of which the stringent sealing requirements are not permanently met. With cyclic bending loads introduced through the tube, the linear support of the tube in the connecting member also leads to settlement and, in consequence, to leakages.

U.S. Pat. No. 4,754,995 describes a similar tube connecting means. The tube has a fold whose first tensioning face constitutes a radius transition between a circular-cylindrical tube portion, arranged in front of the formation, and an inclined face of the union. The radius transition rests against a corresponding face in the connecting member. The face is provided in the form of a radius. The threaded-in nut has an end face which extends radially relative to the longitudinal axis. The nut rests against the second tensioning face. In this case, too, contact is established in the region of transition between the standard circular-cylindrical tube portion and the second portion of transition rounded towards the substantially radially extending part of the tensioning face. In addition, a cylindrical bore of the connecting member is provided with a recess accommodating a seal. The seal rests against the outer face of the cylindrical tube portion arranged in front of the formation.

This embodiment also leads to a disadvantage. When tightening the assembly, especially when repeating the tightening operation, overtightening may occur because there is no firm, tangible stop indicating the final tightening stage of the connection.

SUMMARY OF THE INVENTION

It is an object of the invention to provide a tube connector which clearly indicates when the tightening torque required to achieve accurate sealing is reached.

In accordance with the invention, the formation of the tube is formed such that the first tensioning face extends parallel to the end face of the connecting member. The end face forms a plane perpendicular to the longitudinal axis. The first tensioning face, at least by means of a partial portion, is supported on the end face of the connecting member in the tensioned condition.

The advantage of this embodiment is that the shape of the formation avoids any overtightening due to the arrangement of the material of the two formation portions. A clear rise in the torque applied to the nut directly indicates that the required assembly force has been reached.

In a particularly advantageous embodiment, the connecting member has a conical bore. The conical bore starts from a planar end face. The conical taper is reduced along the longitudinal axis. The smallest diameter of the conical bore is adjoined by a first circular-cylindrical bore. The first circular-cylindrical bore, via an annular shoulder, passes into a second circular-cylindrical bore. The diameter of the second circular-cylindrical bore is reduced relative to the first circular-cylindrical bore. The conical bore of the nut is tapered in a direction opposite to that of the conical bore of the connecting member. Also, in front of the first tensioning face, a circular-cylindrical tube portion is arranged which, in the tensioned condition, extends into the first circular-cylindrical bore of the connecting member. Further, a seal is arranged in the space between the outer face of the tube portion of the first conical bore of the connecting member and the first tensioning face. This embodiment provides a receiving space for a sealing ring to ensure precision sealing. With standard tube connectors, it is critical to provide soft seals. Soft seals either weaken the connecting member or it is necessary to select an assembly which cannot provide optimum sealing conditions. Optimum conditions are not realized since it is impossible to avoid gaps into which the seals can be squeezed. Furthermore, in the case of standard tube connectors with two cutting rings or clamping rings, it is necessary to seal two gaps.

In the case of cutting ring connections, problems are caused by arranging the seal at the tube stop. This is due to the axial thrust on the tube which occurs when tightening the cutting ring which, in turn, results in a load applied to the seal which may lead to excessive loads. An accurate tightening path cannot be ensured. However, in the solution provided by the embodiment of the invention, the seal is protected in position. Also, since there is no cutting ring or clamping ring, only one gap exists which can be effectively sealed in this way.

A particularly advantageous embodiment is achieved if the formation portion forming the second tensioning face starts directly from the first tensioning face formation portion of the tube. This results in a concentration of masses in the radially outer region. Thus, during the tightening operation, a solid portion is formed which causes a clear rise in torque when the respective tightening path has been covered. The seal associated with the tube portion is arranged in front of the formation. The seal is either in the form of an O-ring a sealing ring with a triangular cross-section.

In the embodiment where the formation starts directly from the end of the tube, the bore of the connecting member is adapted to the nominal inner diameter of the connecting tube. Furthermore, in the embodiment starting directly from the tube end, a groove is provided in the end face of the connecting member. The groove accommodates a seal. Here, the surface available at the end face is considerably larger than in the case of a connecting member with a conical bore. Thus, this configuration avoids a substantial weakening effect of the groove. The length of the formation can be adapted to the nut used in a particular application.

From the following detailed description, taken in conjunction with the accompanying drawings and subjoined claims, other objects and advantages of the present invention will become apparent to those skilled in the art.

BRIEF DESCRIPTION OF THE DRAWINGS

Two preferred embodiments are diagrammatically illustrated in the drawing wherein.

DETAILED DESCRIPTION OF THE DRAWINGS

Figure 1:
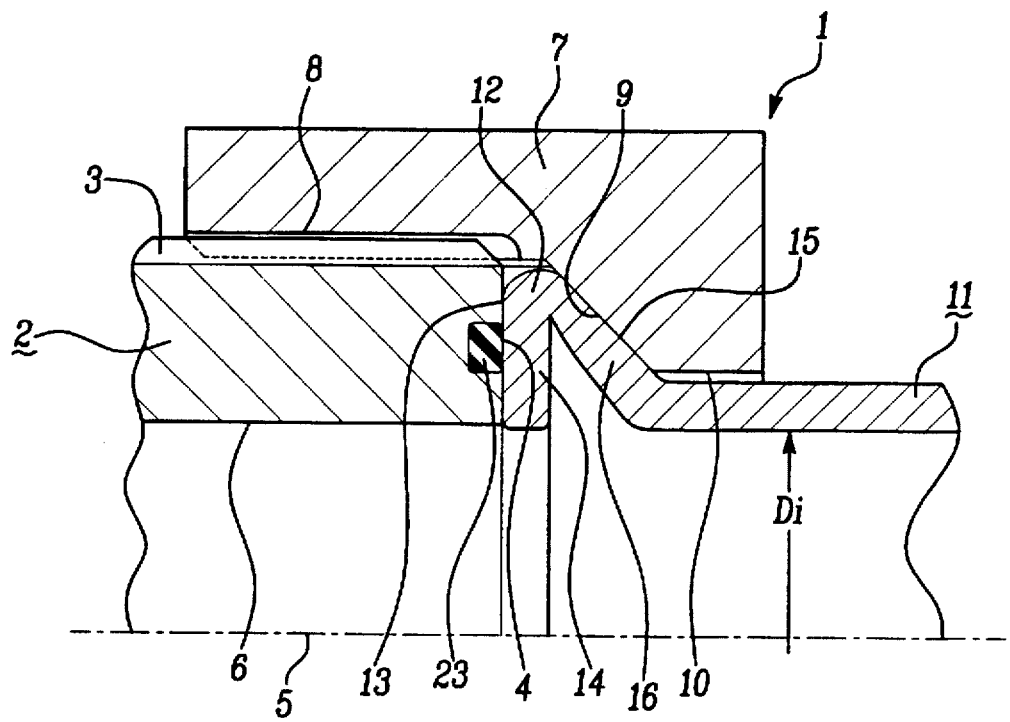
FIG. 1 is a first embodiment of a half cross-section through a portion of tube connecting means where the formation of the tube is positioned directly at the beginning of the tube.

FIG. 1 shows a tube connector 1 with a connecting member 2, nut 7, and a tube 11. Only part of the connecting member 2 is shown. The connecting member refers to the connection of one tube end. The other end can be provided in accordance with the illustration, so that the connecting member 2 serves to connect two tubes. On its outer face, the connecting member 2 includes a thread 3 which starts from the end face 4. The longitudinal axis of the tube connector 1 has been given the reference number 5. A first circular-cylindrical bore 6 is centered on the longitudinal axis 5. The bore 6 extends through the connecting member 2 and ends at the end face 4. The end face 4 has the shape of an annular face. The face 4 has an annular groove accommodating a seal 23. A nut 7 is threaded on to the thread 3 of the connecting member 2 by a bore with a thread 8. Furthermore, the nut 7 includes a second conical bore 9 which is tapered away from the connecting member 2. The end face 4 extends at a right angle relative to the longitudinal axis 5. The longitudinal axis 5 is positioned on a plane perpendicular to the end face 4. The second conical bore 9 is followed by a through-bore 10. The tube 11 passes through the bore 10.

The end of the tube 11 includes an inner diameter D1 which substantially corresponds to the diameter of the bore 6 of the connecting member 2. An inverted V-shaped formation 12, with one leg of the inverted V perpendicular to the longitudinal axis 5, is provided at the end of the tube 11. The formation includes a first formation portion 14 with a tensioning face 13. The tensioning face 13 extends parallel to the end face 4. A second formation portion 16 starts from the largest diameter of the first portion and extends angularly toward tube 11. The second formation portion 16 includes a second tensioning face 15 which is conical. The second tensioning face 15 extends in the same direction as the second conical bore 9. By stopping against the second tensioning face 15, the nut 7, by means of its second conical bore 9, tensions the formation 12 with its first formation portion 14. The associated first tensioning face 13 stops against the end face 4 of the connecting member 2. The seal 23 is arranged between the end face 4 and the first tensioning face 13 to provide a precision seal for the system.

Figure 2:
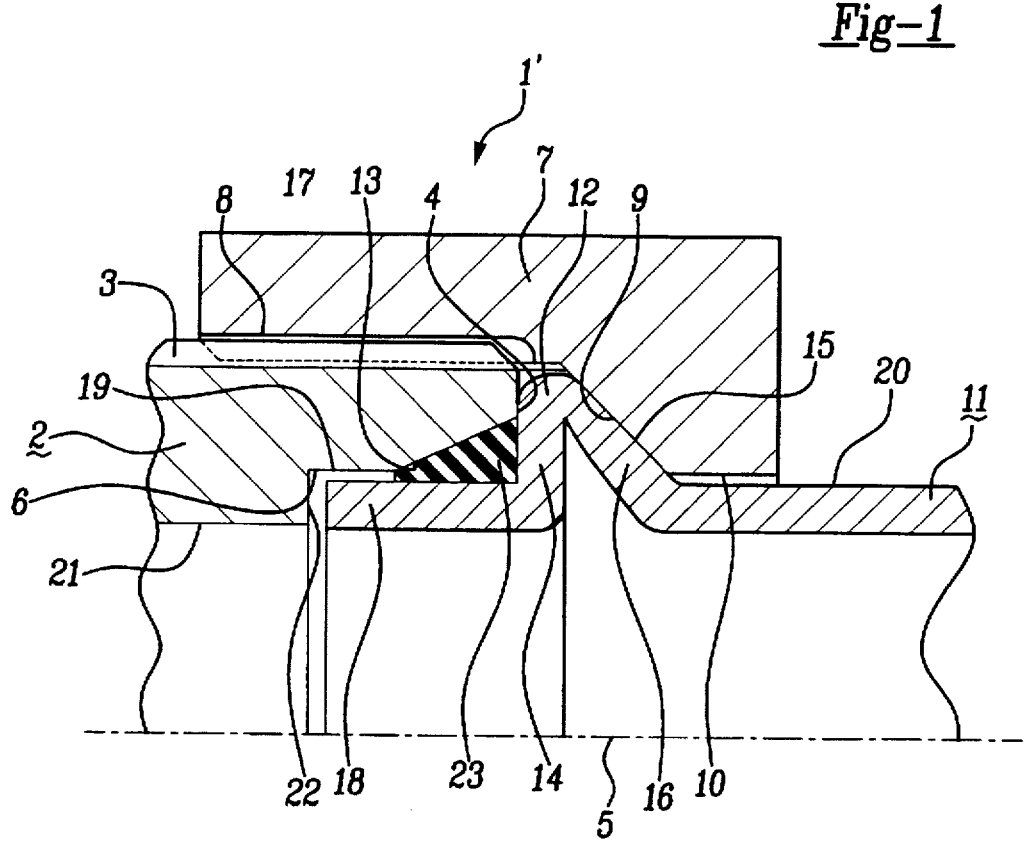
FIG. 2 is a view similar to FIG. 1 of a further embodiment where a circular-cylindrical tube portion is arranged in front of the formation.

FIG. 2 illustrates a tube connector 1' with the connecting member 2 including the thread 3 which starts from the end face 4. The end face 4 defines a plane perpendicular to the longitudinal axis 5 of the tube connecting means 1'. The thread 3 is arranged on the outer face. FIG. 2 again only shows part of the tube connecting means in a half longitudinal section view. Symmetry exists between the longitudinal axis 5 and a transverse plane relative to the longitudinal axis 5. A first conical bore 17 is provided which starts from the end face 4. The first conical bore 17 tapers away from the end face 4 and ends in the first circular-cylindrical bore 6. The diameter of the bore 6 corresponds to the outer diameter of the to be connected tube 11.

The first circular-cylindrical bore 6 ends in an annular shoulder 22. A second cylindrical bore 21 with a reduced diameter starts from the annular shoulder 22. The diameter of the second cylindrical bore 21 substantially corresponds to the nominal inner diameter of the to be connected tube 11.

The nut 7, via thread 8, is threaded on to the thread 3 of the connecting member 2. The threaded bore turns into a second conical bore 9. The second conical bore 9 tapers away from the connecting member 2 and ends in a through-bore 10. The through-bore 10 enables passage of tube 11 which includes a correspondingly smaller diameter. An inverted V-shaped formation 12, which includes one leg of the inverted V perpendicular to the longitudinal axis 5, starts from the tube portion 11 with the outer diameter 20.

The formation 12 extends towards the front end of the tube 11 and includes a first formation portion 14 and a second formation portion 16. The first formation portion 14, perpendicular to the longitudinal axis 5, defines a first tensioning face 13. The tensioning face 13 extends parallel to the end face 4. This means that the first tensioning face 13 defines a planar face perpendicular to the longitudinal axis 5. The greatest diameter of first formation portion 14 is directly followed by the second formation portion 16 which angles to the tube 11.

The second formation portion 16 defines a conical second tensioning face 15 which corresponds to the second conical bore 9 of the nut 7. A tube portion 18 is arranged in front of the first formation portion 14. The tube portion 18 is of circular-cylindrical shape. The tube portion 18 includes a bore which corresponds to the nominal inner diameter of the tube 11. The length of the tube portion 18 is such that, via its outer face 19, it projects into the first cylindrical bore 6 without contacting the annular shoulder 22 in the tensioned condition of the tube connector 1'.

A substantially triangular space is formed between the outer face 19 of the tube portion 18, the first conical bore 17 of the connecting member 2, and the first tensioning face 13. A seal 23 is arranged in the triangular space. The seal 23 is approximately triangular in shape, but it is also possible to provide an O-ring seal. In the course of the assembling operation, the seal 23 is held in a preassembled condition on the outer face 19 of the tube portion 18. Thus, the seal 23 seals the only gap which may lead to leakages.

In addition, it is also possible to fill the space which occurs during forming of the formation portions 14, 16. For example, a seal ring may be inserted during the forming operation. The ring adapts itself to the existing space.

While the above detailed description describes the preferred embodiment of the present invention, the invention is susceptible to modification, variation and alteration without deviating from the scope and fair meaning of the subjoined claims.

We claim:

1. A tube connector defining a longitudinal axis comprising:

a connecting member including a conical bore, said conical bore starting from a planar end face of the connecting member, the conical bore taper being reduced along a longitudinal axis and with its smallest diameter adjoining a first circular-cylindrical bore, an annular shoulder in said connecting member separating said first circular-cylindrical bore from a second circular-cylindrical bore, said second circular cylindrical bore having a diameter reduced relative to the diameter of the first circular-cylindrical bore;

an outer surface of said connecting member including a thread;

a nut including a thread is threadable onto the connecting member, the nut includes a conical bore, the conical bore of the nut being tapered in the direction opposite to that of the conical bore of the connecting member and including an open bore at the end of the taper;

a tube is guided through the bore of the nut, the tube including an inverted V-shaped formation with two legs coupled at a vertex and each leg having a tensioning face, said legs spaced from one another to form a gap between the two legs, a first tensioning face being supported on the connecting member in the tensioned condition of the tube connector and a second conical shape tensioning face corresponding to the conical bore of the nut and being directly supported via a planar contact in the conical bore of the nut, the formation of the tube is such that the first tensioning face extends parallel to the end face of the connecting member, the end face defines a plane perpendicular to the longitudinal axis, and the first tensioning face, at least by means of a partial portion, being supported on the end face of the connecting member in the tensioned condition, and in front of the first tensioning face, a circular-cylindrical portion is arranged which, in the tensioned condition, extends into the first circular-cylindrical bore of the connecting member and a seal being arranged in a space between the outer face of the tube portion of the first conical bore of the connecting member and the first tensioning face, wherein upon tightening of the nut on the connecting member, axial force is exerted by the nut onto the inverted V-shaped formation, wherein said inverted V-shape formation prohibits collapsing of said legs and maintains said gap between the two legs, and when an increased torque is applied on the nut, the increased torque indicates that a required assembly force has been reached, thus prohibiting overtightening of the nut.

2. The tube connector according to claim 1, wherein the formation portion including the second tensioning face starting directly from the first formation portion of the tube including the first tensioning face.

3. The tube connector according to claim 1, wherein the seal is an O-ring.

4. The tube connector according to claim 1, wherein the seal is a sealing ring with a triangular cross-section.

5. The tube connector according to claim 1, wherein the bore of the connecting member being adapted to the nominal inner diameter of the tube.

* * * * *